(12) United States Patent
Uchida et al.

(10) Patent No.: US 7,366,106 B2
(45) Date of Patent: Apr. 29, 2008

(54) RADIO COMMUNICATION TERMINAL AND COMMUNICATION METHOD

(75) Inventors: Tsutomu Uchida, Yokohama (JP); Hiroshi Tamaribuchi, Yokohama (JP); Hideo Aoe, Yokohama (JP); Masato Inagaki, Fujisawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 672 days.

(21) Appl. No.: 10/769,630

(22) Filed: Jan. 30, 2004

(65) Prior Publication Data

US 2005/0113028 A1 May 26, 2005

(30) Foreign Application Priority Data

Nov. 21, 2003 (JP) ............................. 2003-391618

(51) Int. Cl.
*G01R 31/08* (2006.01)
(52) U.S. Cl. .................. 370/252; 370/232; 370/322; 455/566; 455/67.7; 455/67.11; 455/522
(58) Field of Classification Search ............... 370/232, 370/322, 252; 455/522, 69, 67.7, 67.11
See application file for complete search history.

(56) References Cited

U.S. PATENT DOCUMENTS

| | | | | |
|---|---|---|---|---|
| 6,567,416 | B1 * | 5/2003 | Chuah ........................ | 370/418 |
| 2002/0018446 | A1 * | 2/2002 | Huh et al. ................... | 370/245 |
| 2003/0086371 | A1 * | 5/2003 | Walton et al. ............... | 370/235 |
| 2003/0117956 | A1 * | 6/2003 | Lee ............................. | 370/232 |

FOREIGN PATENT DOCUMENTS

| | | |
|---|---|---|
| JP | 05-056119 | 3/1993 |
| JP | 05-207544 | 8/1993 |
| JP | 2003-125440 | 4/2003 |
| KR | 2001-0064890 A | 7/2001 |
| WO | WO 01/39386 A1 | 5/2001 |

OTHER PUBLICATIONS

3rd Generation Partnership Project, "Technical Specification Group Radio Access Network: Manifestations of Handover and SRNS Relocation (Release 4)," 3GPP TR 25.832 V4.0.0 (Mar. 2001), Chapter 5.2, pp. 7-9.

3rd Generation Partnership Project 2, "BTS-BSC Inter-operability ($A_{b=3}$ interface)," 3GPP2 A.S0003-A, Version 2.0 (Jul. 2001), Chapter 4, pp. i-iv and 47-57.

* cited by examiner

*Primary Examiner*—Lester G. Kincaid
*Assistant Examiner*—Dung Lam
(74) *Attorney, Agent, or Firm*—Townsend and Townsend and Crew LLP

(57) ABSTRACT

A radio communication terminal, being used in a radio communication systems in which the transmission rate varies depending on radio wave conditions and communication statuses of other users, comprises a reception module which receives packets transmitted by a base station in an idle state of the radio communication terminal, a signal processing module which estimates a transmission rate available in communication based on the packets received by the reception module, and a display module which displays information indicating the transmission rate estimated by the signal processing module.

9 Claims, 11 Drawing Sheets

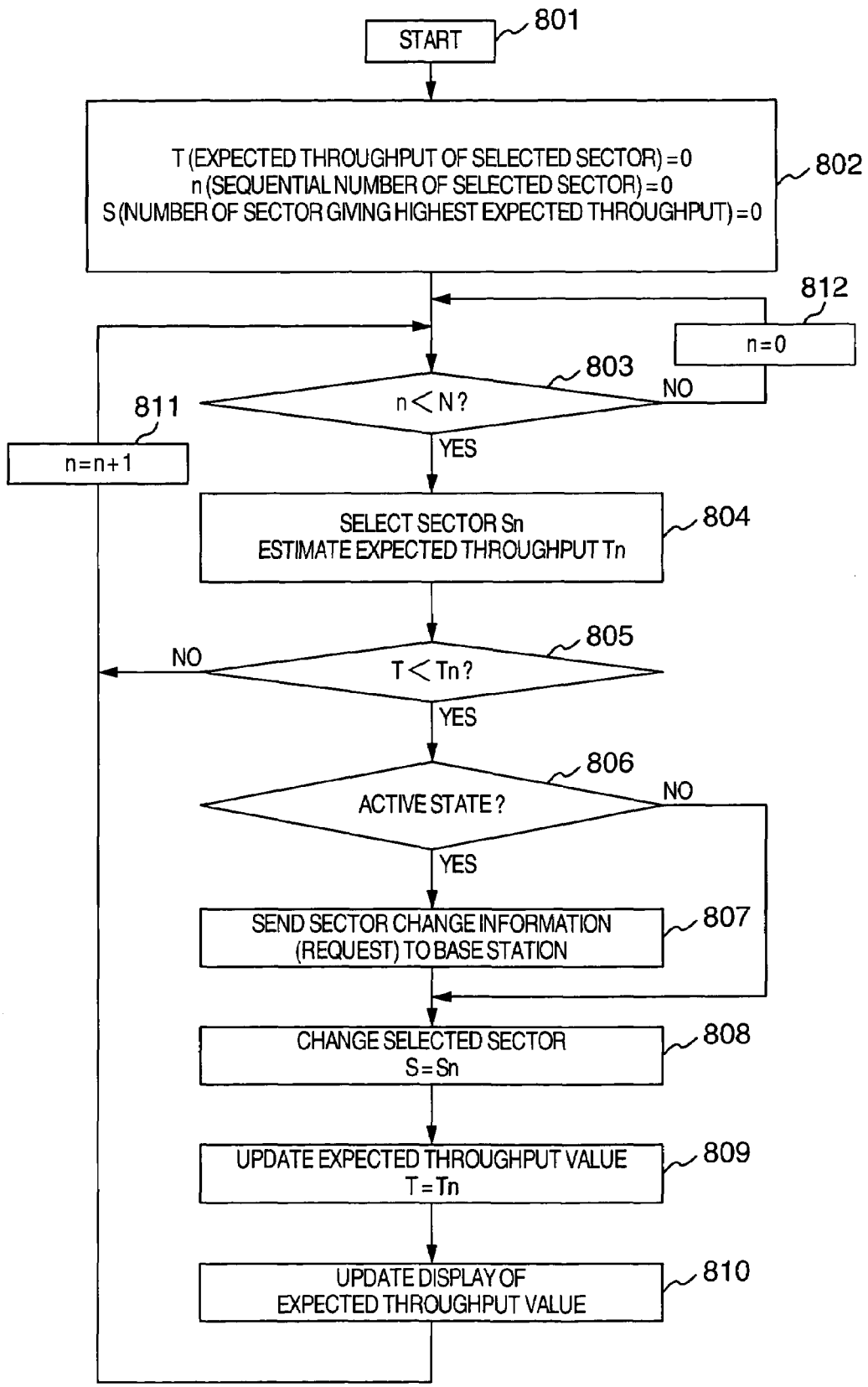

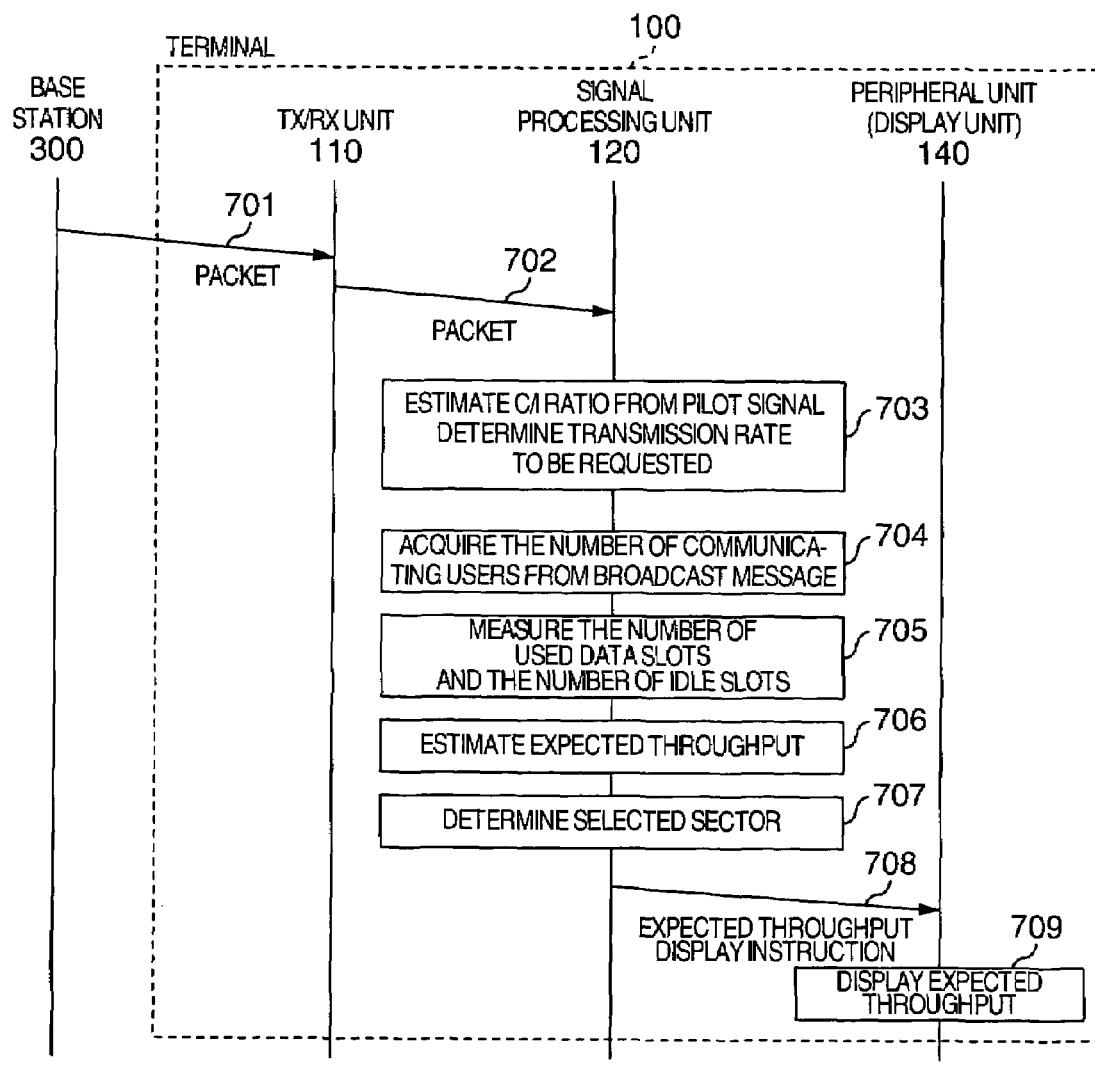

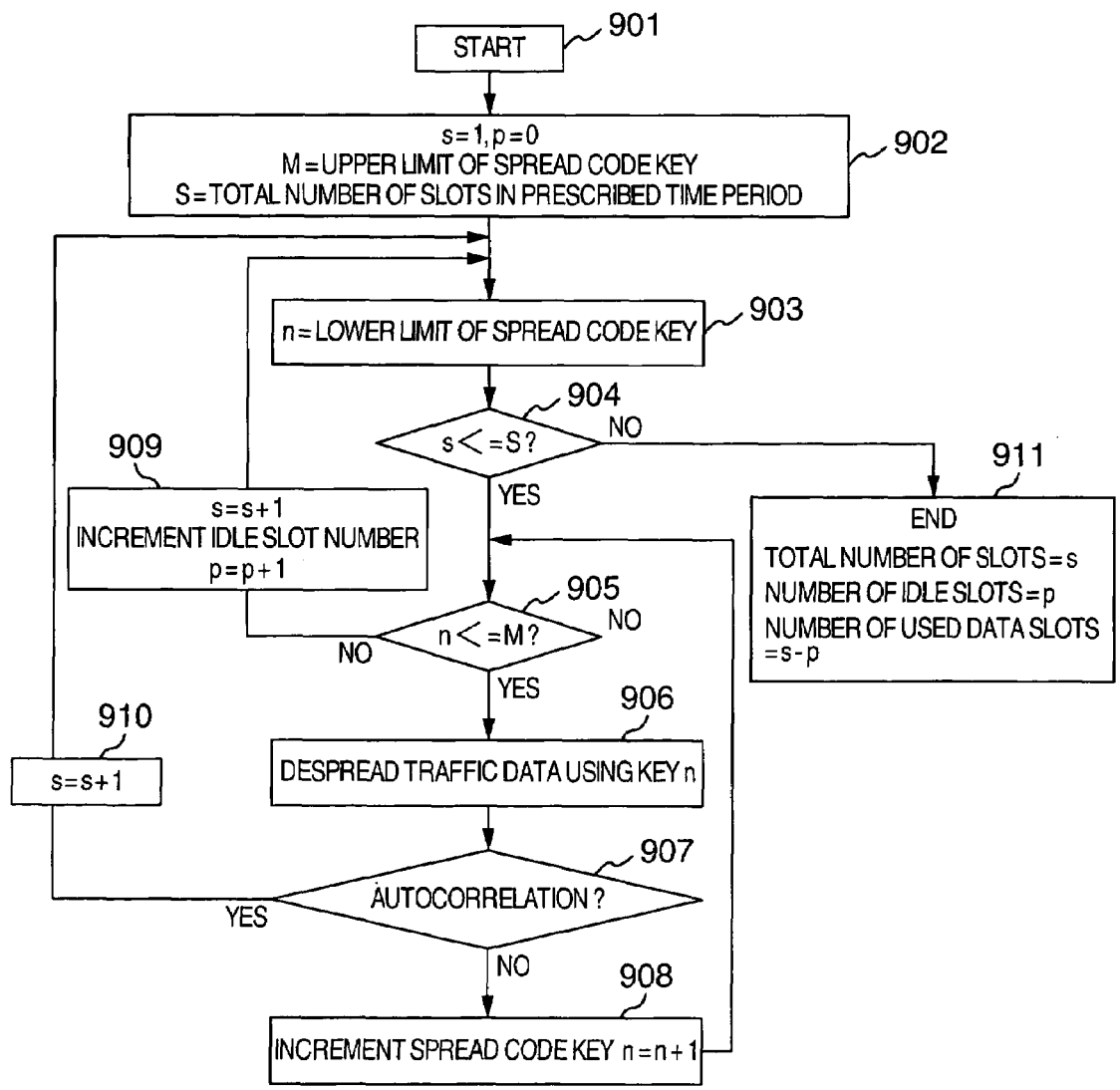

FIG.8

$$601 \text{ EXPECTED THROUGHPUT} = 602 \text{ REQUESTED TRANSMISSION RATE} \times \frac{\overbrace{603 \text{ NUMBER OF IDLE SLOTS} + \overbrace{\dfrac{604 \text{ NUMBER OF USED DATA SLOTS}}{605 \text{ (NUMBER OF CONNECTED TERMINALS}+1)}}^{606} + \overbrace{\text{NUMBER OF IDLE SLOTS}}^{607}}^{610}}{\underbrace{609 \text{ NUMBER OF USED DATA SLOTS}}}$$

FIG.14

| SECTOR #1 | TERMINAL | NUMBER OF ASSIGNED SLOTS |
|---|---|---|
| | 100-1 | 95 |
| | 100-2 | 15 |
| | 100-4 | 23 |
| | 100-5 | 8 |
| | 100-6 | 50 |
| | 100-7 | 64 |
| | 100-8 | 98 |
| | 100-9 | 25 |
| | 100-10 | 29 |
| | 100-11 | 160 |
| | 100-12 | 2 |
| | 100-13 | 5 |
| | 100-14 | 9 |
| | 100-15 | 4 |
| | 100-16 | 36 |
| | 100-17 | 2 |
| | 100-18 | 5 |
| | 100-19 | 9 |
| | 100-20 | 4 |
| | 100-21 | 75 |
| | 100-22 | 6 |
| | 100-23 | 8 |
| | 100-24 | 4 |
| | 100-25 | 5 |
| | 100-26 | 13 |
| | 100-27 | 1 |
| | 100-28 | 5 |
| | 100-29 | 32 |
| | 100-30 | 2 |
| | 100-31 | 6 |
| | IDLE SLOT | 200 |
| TOTAL NUMBER OF DATA SLOTS | | 800 slots |

| SECTOR #2 | TERMINAL | NUMBER OF ASSIGNED SLOTS |
|---|---|---|
| | 110-1 | 152 |
| | 110-2 | 187 |
| | 110-3 | 61 |
| | IDLE SLOT | 600 |
| TOTAL NUMBER OF DATA SLOTS | | 400 slots |

FIG.15

| TYPE OF INFORMATION | SECTOR #1 | SECTOR #2 |
|---|---|---|
| C/I | 3 db | -1 db |
| REQUESTED TRANSMISSION RATE | 1228.8 kbps | 614.4 kbps |
| NUMBER OF USED DATA SLOTS | 800 slots | 400 slots |
| NUMBER OF IDLE SLOTS | 200 slots | 600 slots |
| NUMBER OF COMMUNICATING TERMINALS | 30 users | 3 users |
| EXPECTED THROUGHPUT | 277.5 kbps | 430.1 kbps |

RADIO COMMUNICATION TERMINAL AND COMMUNICATION METHOD

BACKGROUND OF THE INVENTION

The present invention relates to a radio communication terminal or access terminal to be used in a radio communication system and a communication method for the radio communication terminal.

Radio communication systems for communicating are being rapidly introduced to various fields in recent years. Especially, CDMA (Code Division Multiple Access) radio communication systems, communicating information (audio information, etc.) by code division multiplexing the information by use of a plurality of spread codes, have recently become widespread, by which high-speed communication irrespective of time, place and the party has become possible. As a type of CDMA, 1×EV-DO (1×EVolution Data Only) radio communication system is known, for example. Since 1×EV-DO employs variable bit rate communication (best effort radio communication system), higher transmission rate is more beneficial to the users.

However, in best effort radio communication systems like 1×EV-DO, the transmission rate can not arbitrarily be designated and set by the user but varies depending on conditions of radio waves. Thus, techniques for easily checking the radio wave conditions and controlling the communication method depending on the radio wave conditions are required. For example, a mobile terminal disclosed in JP-A-5-207544 estimates quality of communication (communication quality) based on electric field intensity information, noise information, etc. concerning received radio signals and previously obtained communication quality measurement/judgment results, and displays availability/unavailability of voice communication, availability/unavailability of data communication, maximum data transmission rate (when data communication is available), etc. on its display screen. In a radio communication system disclosed in JP-A-2003-125440, a control station (which determines a radio channel to be used for radio communication between a mobile station and a base station) calculates throughput of each radio channel that can be allocated to a mobile station (whose transmission rate varies depending on the allocated radio channel) and allocates a suitable radio channel to the mobile station based on the calculated throughput.

In such communication systems, a terminal can move from a cell (an area covered by radio waves transmitted by a base station) to another cell while communicating with a base station of each cell, therefore, a technique called "handover" or "handoff", for maintaining the communication even when the terminal moves across cell borders, becomes necessary. In CDMA radio communication systems, a technique called "soft handover" or "soft handoff" is used, in which a mobile terminal simultaneously communicates with a plurality of base stations and the communication is maintained by selecting a base station in the best communication status from the base stations simultaneously communicating with the mobile terminal (see 3GPP TR25.832 Chapter 5.2 and 3GPP2 A.S0003-A (Version 2.0) Chapter 5.4, for example).

SUMMARY OF THE INVENTION

As described above, while higher transmission rate is more beneficial to the users in best effort radio communication systems such as 1×EV-DO, the transmission rate can not be arbitrarily designated by the user but changes depending on the radio wave conditions, communication statuses of other users, etc. For example, an increase in the number of terminals existing in the cell, application software used by the terminal, etc. can also deteriorate the transmission rate. Thus, even in a communication environment giving high reception intensity, a high transmission rate can not be expected in cases where high-capacity data transmission is being done by a plurality of terminals in the cell.

Therefore, users of such radio communication systems (with the transmission rate varying depending on the radio wave conditions, communication statuses of other users, etc.) will soon hope to be informed of the highest transmission rate available or attainable in the current environment or conditions.

However, in the above techniques described in JP-A-5-207544 and JP-A-2003-125440, the judgment of communication quality or the calculation of throughput requires actual communication, affecting radio communication of other users (e.g. deterioration of communication quality). Thus, it can be hardly said that such techniques are capable of obtaining the currently optimum transmission rate (throughput) and are convenient to the system provider and the users.

Further, in a radio communication system with the transmission rate varying according to the radio wave conditions and the communication statuses of other users, it is desired that a terminal carrying out the soft handover can select a base station realizing the highest throughput in the current communication environment.

However, since the soft handover technique stipulated in the aforementioned documents (3GPP TR25.832 Chapter 5.2 and 3GPP2 A.S0003-A (Version 2.0) Chapter 5.4, for example) executes the switching of base stations by estimating the communication quality mainly based on the electric field intensity, data communication is carried out necessarily below the highest transmission rate that is actually attainable. Such systems are not attractive to system providers and users expecting to offer and enjoy information communication capability at the maximum transmission rate.

It is therefore the primary object of the present invention to provide a radio communication terminal capable of estimating or letting the user know the maximum transmission rate available in actual communication (expected throughput) without the need of actually communicating (in the idle state of the terminal) in a radio communication system with the transmission rate varying depending on the radio wave conditions and the communication statuses of other users.

Another object of the present invention is to provide a radio communication terminal capable of carrying out radio communication by selecting a base station that can deliver the maximum throughput in a radio communication system with the transmission rate varying depending on the radio wave conditions and the communication statuses of other users.

In order to attain the above object, a radio communication terminal in accordance with the present invention receives packets from a plurality of base stations in its idle state, estimates a transmission rate (expected throughput) available for communication based on information contained in the packets received from each base stations, and selects a sector that gives the highest expected throughput.

Each packet is composed of a broadcast message area and a communication information area (traffic data area), and each of the areas is composed of a plurality of slots as units of time division. Each slot of the broadcast message area and the communication information area contains a pilot signal, and information indicating the number of radio communication terminals communicating in the sector is stored in a slot of the broadcast message area.

The radio communication terminal of the present invention obtains an expected throughput for each base station based on a requested transmission rate (requested of each base station) estimated from the pilot signal, the aforementioned number of terminals, and the number of used data slots and the number of idle slots obtained from the communication information area, and displays the highest one of the expected throughputs on a display module, by which communication with the base station corresponding to the highest expected throughput becomes possible when the terminal conducts actual communication.

By the present invention, the expected throughput can be estimated in the idle state of the radio communication terminal and displayed on the display module of the terminal. Therefore, the user is allowed to learn the expected throughput without the need of actually carrying out communication.

Further, by the selection of the sector capable of exhibiting high throughput, highly efficient data communication is made possible.

Referring now to the drawings, a description will be given in detail of preferred embodiments in accordance with the present invention.

BRIEF DESCRIPTION OF THE DRAWINGS

The objects and features of the present invention will become more apparent from the consideration of the following detailed description taken in conjunction with the accompanying drawings, in which:

FIG. 4 is a flow chart showing a process conducted by the radio communication terminal for determining a "selected sector";

FIG. 5 is a flow chart showing the details of a process conducted by the radio communication terminal for estimating an expected throughput when the terminal is in its idle state;

FIG. 6 is a table showing the contents of a table which is used for determining a requested transmission rate;

FIG. 7 is a flow chart showing a process conducted by the radio communication terminal for obtaining the number of used data slots and the number of idle slots;

FIG. 8 is a schematic diagram showing a mathematical formula for obtaining the expected throughput;

FIG. 14 is a table showing an example of slot assignment; and

FIG. 15 is a table showing results of a process for obtaining the expected throughput.

DESCRIPTION OF THE EMBODIMENTS

Figure 1:
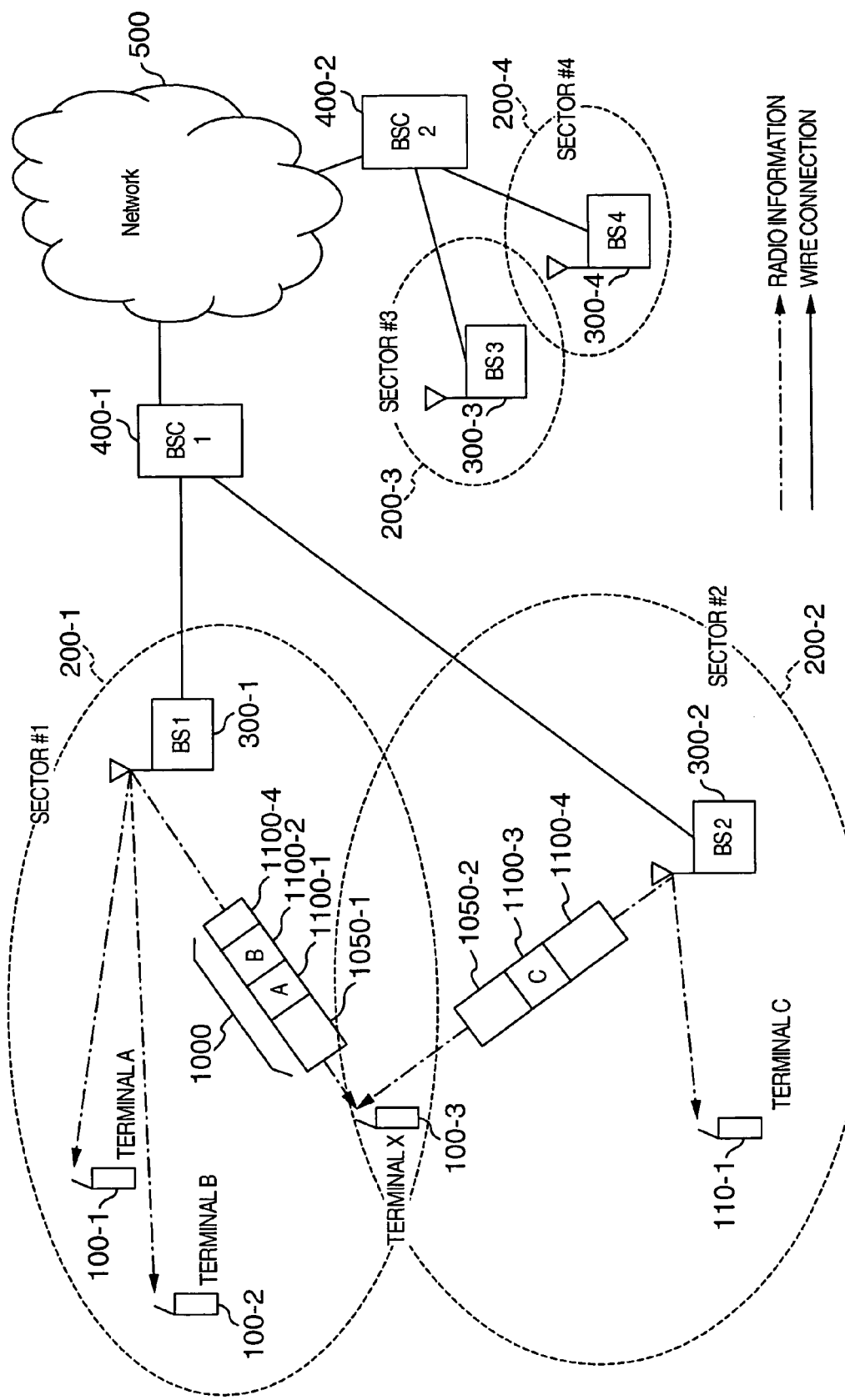
FIG. 1 is a schematic block diagram showing the overall composition of a radio communication system in accordance with an embodiment of the present invention.

FIG. 1 is a schematic block diagram showing the overall composition of a radio communication system in accordance with an embodiment of the present invention. Each radio communication terminal (100-1, 100-2, . . . ) establishes a radio communication channel with a radio communication apparatus (300-1). In this embodiment, a radio communication area managed by the base station 300-1 is referred to as a "sector" 200-1, in which a plurality of terminals (100-1, 100-2, . . . ) are connectable to the base station 300-1. Other sectors 200-2, 200-3, 200-4, . . . are also defined similarly. In order to realize the handover between sectors, adjacent sectors (e.g. sectors 200-1 and 200-2) overlap with each other.

The base stations 300-1 and 300-2 are connected by wire to a base station controller 400-1. Similarly, the base stations 300-3 and 300-4 are connected by wire to a base station controller 400-2.

The base station controllers 400-1 and 400-2 are both connected by wire to a network 500 such as the Internet or a public communications network.

Each terminal receives packets 1000 from a base station via the radio communication channel established between the base station and the terminal. While details will be described later, the packet 1000 contains communication data or communication information (hereafter, referred to as "traffic data") 1100 actually handled by the user and broadcast messages 1050 containing a variety of information (status of the base station, etc.) necessary for the connection of the terminal with the base station. The broadcast message 1050 and the traffic data 1100 are both composed of a plurality of "slots" (units of time division), and each slot contains a pilot signal 1200. Each terminal measures reception intensity (reception power) based on the pilot signal received from the base station and thereby estimates a characteristic value regarding the communication quality. A ratio called C/I or CIR (Carrier to Interference Power Ratio), as a signal power ratio between a desired signal from the base station and other received signals (interference power), is generally used as a parameter regarding the communication quality. The packet 1000 includes a traffic data area 1100 for storing the communication data of the user, in which data for each user are stored in units of slots. When there is no communication data to be stored in a slot, the slot is transmitted in an idle or vacant state (hereinafter referred to as an "idle slot").

In order to perform data communication, the terminal 100-1 first sends a connection request to the base station 300-1. The base station 300-1 which received the connection request from the terminal 100-1 first establishes a communication channel with the base station controller 400-1 and then assigns radio resources to the terminal 100-1, by which a radio communication channel between the terminal 100-1 and the base station 300-1 is established. For the radio resource assignment process and/or the communication with the base station controller or a network on a still higher level, specific functions for authentication, billing (charging), etc. may also be employed.

The terminal 100-1, having established the radio communication channel and ready for data communication, estimates a maximum transmission rate allowing data reception in its communication environment, and requests the base station 300-1 to employ the maximum transmission rate. In response to the request, the base station 300-1 carries out data transmission to the terminal 100-1 at the requested transmission rate. The terminal 100-1 may use a table like that shown in FIG. 6 for the estimation of the transmission rate to be requested. Details of the table will be explained later.

Figure 2:
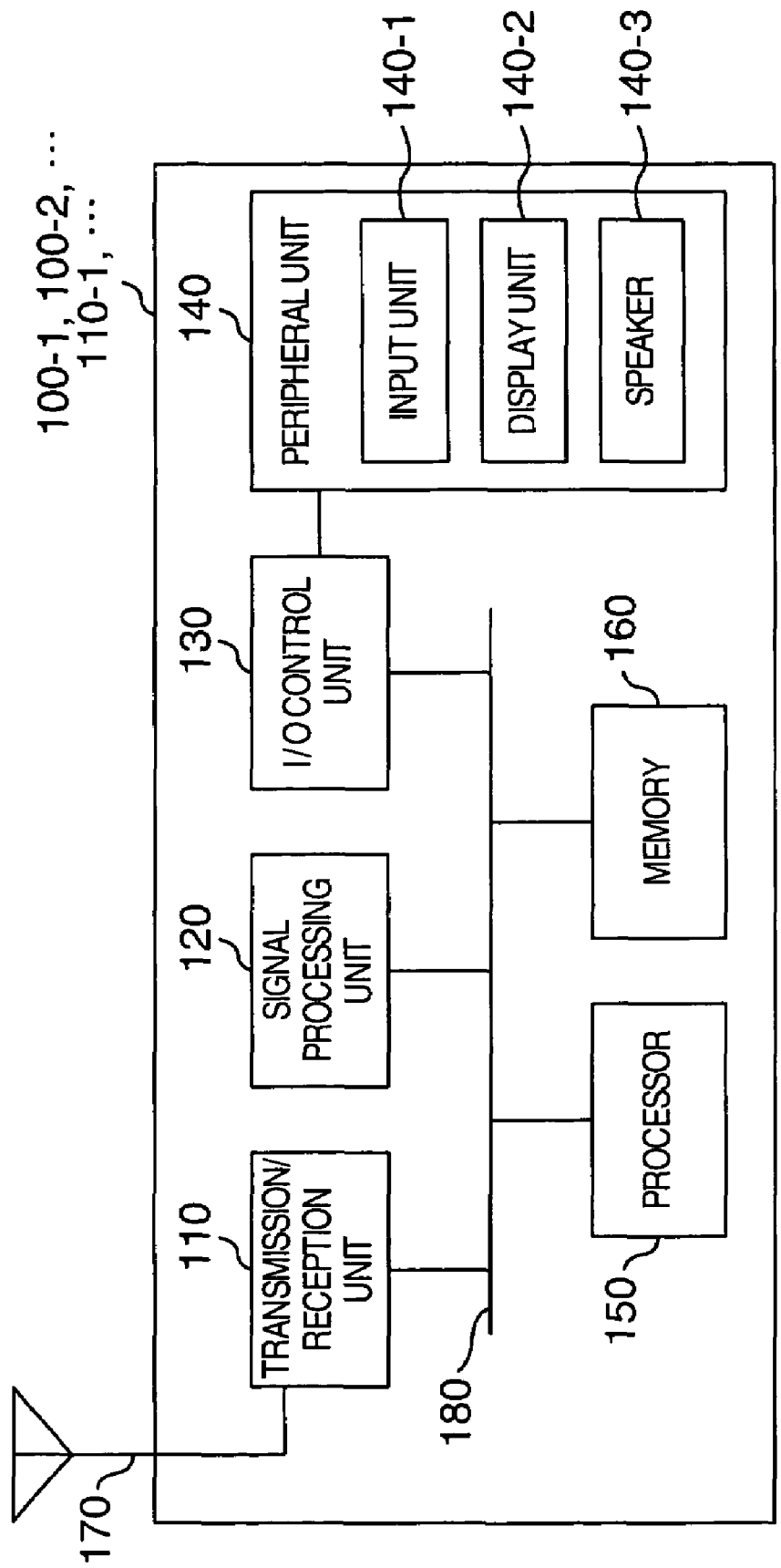
FIG. 2 is a block diagram showing an example of the composition of a radio communication terminal in accordance with the present invention.

FIG. 2 is a block diagram showing an example of the composition of the radio communication terminal in accordance with the present invention. Each terminal (100-1, 100-2, . . . , 110-1, . . . ) includes an antenna 170, a transmission/reception unit 110, a signal processing unit 120, an I/O control unit 130, a peripheral unit 140, a processor 150, and a memory (storage unit) 160.

The peripheral unit 140 is provided with an input unit 140-1 having keys for inputting data and instructions (for call origination, etc.), a display unit 140-2 for displaying expected throughput, etc., and a speaker 140-3. The input unit 140-1 may also employ a touch panel, mouse pointer, microphone, etc. Although not shown in FIG. 2, an output unit for printing out the information displayed on the display unit 140-2 (estimation result, etc.) may also be provided to the peripheral unit 140.

The transmission/reception unit 110 receives packets (containing the traffic data 1100 and the broadcast messages 1050) from the base station through the antenna 170, while transmitting packets to the base station by the antenna 170. For the communication with the base station, the transmission/reception unit 110 conducts modulation/demodulation processes according to PSK (Phase Shift Keying), etc.

The signal processing unit 120 estimates the throughput (expected throughput) based on the broadcast message 1050 and the traffic data 1100 contained in the received packets and thereby determines a "selected sector" (a sector selected by the terminal for communication). The expected throughput obtained by the signal processing unit 120 is displayed on the display unit 140-2.

The memory 160 stores control programs (for the estimation of the expected throughput, determination of the selected sector, connection to a base station in the selected sector) to be executed by the processor 150.

Figure 3:
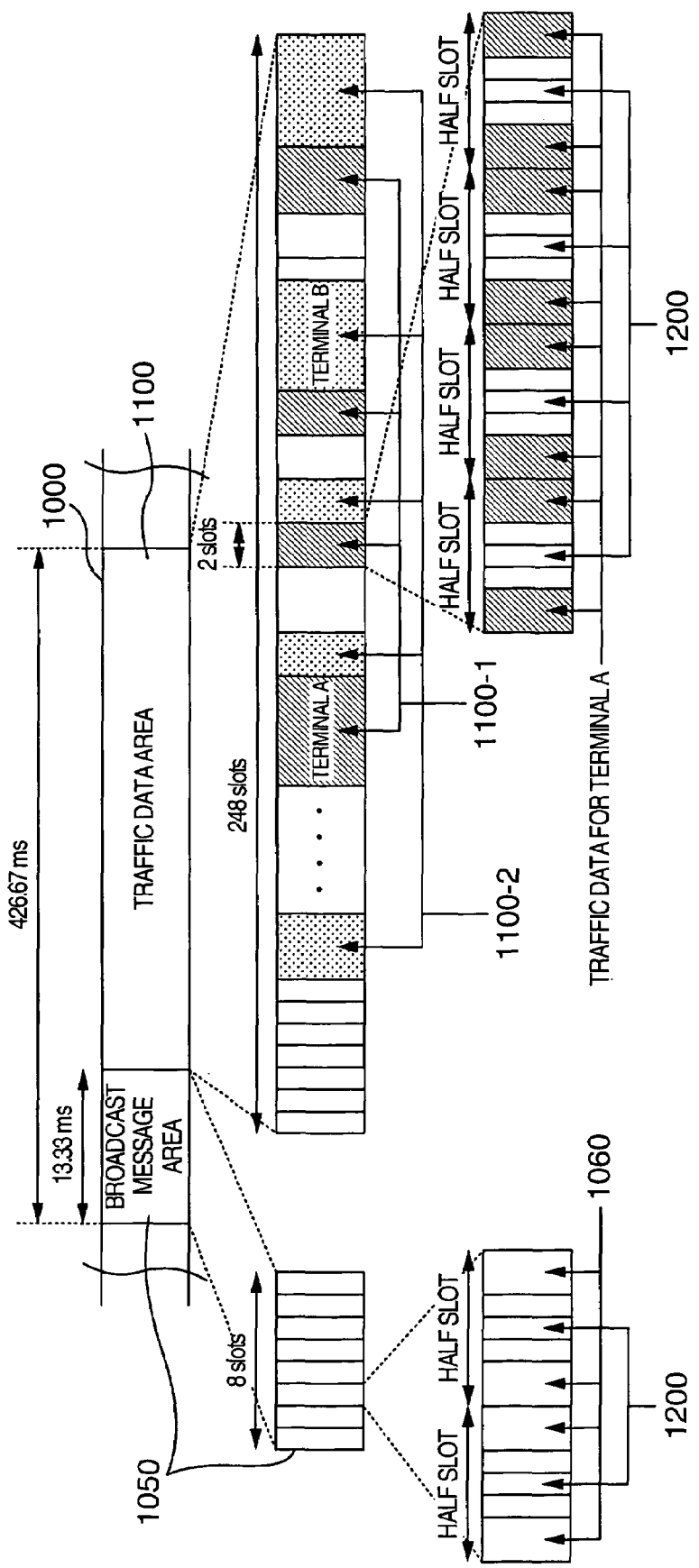
FIG. 3 is a schematic diagram showing the composition of a packet.

FIG. 3 is a schematic diagram showing the composition of the packet 1000. The packet 1000 is partitioned into two areas: a broadcast message area 1050 and a traffic data (communication information) area 1100. The broadcast message area 1050 and the traffic data area 1100 are both composed of a plurality of slots as units of time division. In this embodiment, the duration of each slot is 1/600 s (approximately 1.67 ms). The broadcast message area 1050 is composed of 8 slots (or 16 slots), while the traffic data area 1100 is composed of 248 slots (or 240 slots). Each base station packs necessary information in the packet 1000 (as a cycle of approximately 426.67 ms composed of 256 slots), and continuously transmits the packets to the terminals. Incidentally, each slot is composed of a pair of half slots, and the pilot signal 1200 is stored at the center of each half slot.

Broadcast message data 1060 in the broadcast message area 1050 of the packet transmitted by a base station includes, for example, information on the number of terminals connected to the base station.

The traffic data area 1100 contains communication data (communication information) addressed to a plurality of terminals. Each slot of the traffic data area 1100 stores communication data addressed to a particular terminal, and the assignment of the slots to the terminals is determined by the base station transmitting the packet. Slots that are assigned to no terminal become the aforementioned idle slots containing no communication data. The data stored in each slot and addressed to a terminal have been encoded by the base station by use of a key that is unique to the terminal. The base station has already informed the terminal about the key(s) as one of the radio resources (when the terminal established the radio communication channel with the base station). The terminal which received the encoded data from the base station decodes the data using the key and thereby recognizes the data as correct data.

FIG. 4 is a flow chart showing a process for determining the "selected sector". First, various data stored in the memory 160 is initialized (step 802). In the step 802 of FIG. 4, the symbol "T" denotes the expected throughput in the sector where the terminal is going to establish (or has established) a radio communication channel. The symbol "n" denotes a numerical value used in the flow for the sake of convenience. In this embodiment, "n" is a logical number assigned to each sector from which the terminal can receive the pilot signal 1200. The terminal properly reassigns the logical numbers "n" when a change occurred in the combination of the sectors from which the pilot signal 1200 can be received. As a rule for the logical number assignment, nonnegative integers are assigned to the sectors in consecutive order starting from a certain smallest number. The symbol "S" denotes the number of a sector whose expected throughput is the highest. The symbol "N" denotes the number of "receivable sectors" (sectors from which the pilot signal 1200 can be received) estimated by the terminal based on the pilot signal 1200 received from a plurality of base stations. The number N changes when the number of "receivable sectors" changed due to the change of environment (movement of the terminal, etc.). After the initializing step 802 is finished, in the step 803, the signal processing unit 120 judges whether or not the process of FIG. 4 has been conducted for all of the N receivable sectors from which the pilot signal 1200 can be received. If there remains an unprocessed sector n (YES in the step 803), the terminal receives packets 1000 from the sector n, obtains data necessary for the estimation of the expected throughput, and estimates the expected throughput Tn (step 804).

Subsequently, the signal processing unit 120 judges whether or not the expected throughput Tn of the sector n is higher than the expected throughput T of the currently selected sector (step 805). If the newly obtained expected throughput Tn is higher (YES in the step 805), the signal processing unit 120 changes the selected sector to the sector n.

Steps 806-810 are the process for changing the selected sector, in which the terminal sends a sector change request to the base station (step 807) if the terminal is in its active state (call connected state) (YES in step 806). Subsequently, the signal processing unit 120 executes the selected sector changing process and thereby stores information on the new sector (corresponding to the higher expected throughput) in the memory 160 (step 808), updates the expected throughput stored in the memory 160 into Tn (step 809), and changes the display into that corresponding to the new expected throughput Tn (step 810).

Meanwhile, if the processing unit 120 decides the terminal being not in the active state (NO in the step 806), the signal processing unit 120 directly proceeds to the step 808 and executes the selected sector changing process (steps 808-810). After the selected sector changing process is finished, the number n is incremented by 1 (step 811) and the process is returned to the step 803. By the repetition of the above-mentioned steps 803-810, the estimation of the expected throughput is conducted for all the sectors from which the pilot signal 1200 can be received.

After the above process for the estimation of expected throughput and the determination of selected sector is completed for all the receivable sectors by the reception of the pilot signal 1200, the number n is initialized to 0 (step 812) and thereafter the process for the estimation of expected throughput and the determination of selected sector is executed again for all the receivable sectors (from which the pilot signal 1200 can be received). By the repetition of the above process, the signal processing unit 120 can select a sector giving the highest expected throughput.

Incidentally, while all the receivable sectors (from which the pilot signal 1200 can be received) are regarded as candidates for the "selected sector" in this embodiment, the candidates may be restricted to sectors fulfilling a proper condition (for example, sectors from which the pilot signal 1200 can be received with radio field intensity higher than a threshold intensity).

FIG. 5 is a flow chart showing the details of a process for estimating the expected throughput when the terminal is in its idle state (with no call connection). The signal processing unit 120 of the terminal receives packets 1000 transmitted by the base station via the transmission/reception unit 110 (steps 701 and 702), extracts pilot signals 1200 from slots of the received packet 1000s, and thereby estimates the C/I ratio. From the estimated C/I ratio and a table stored in the memory 160 which will be explained later, the signal processing unit 120 determines the transmission rate to be requested of the base station (step 703).

The signal processing unit 120 also obtains the number of terminal connected to (communicating with) the base station (sender of the packet 1000) from the broadcast message 1050 contained in the packet 1000 (step 704). The number of the connected terminals can be obtained from, for example, the Forward Traffic Valid bit contained in the Quick Config message. Further, the signal processing unit 120 counts the number of data slots being used and the number of idle slots by referring to the traffic data 1100 (step 705). Based on the above information (requested transmission rate, the number of connected terminals, the number of used data slots, and the number of idle slots), the signal processing unit 120 estimates the expected throughput in the sector (step 706).

Thereafter, the signal processing unit 120 determines a sector that gives the highest expected throughput by the aforementioned process shown in FIG. 4 (step 707) and instructs the display unit 140-2 to display the highest expected throughput (step 708). In response to the instruction, the display unit 140-2 displays the expected throughput (step 709). When a change occurs to the expected throughput or the selected sector, the expected throughput displayed on the display unit 140-2 is updated by the process of FIG. 5. When no change occurs to the expected throughput nor the selected sector, the expected throughput on the display unit 140-2 remains constant.

FIG. 6 shows the contents of a table 60 which is used for determining the requested transmission rate. In the table 60 held in the memory 160, a plurality of C/I ratios 60-1 and corresponding transmission rates 60-2 are prestored.

In this embodiment, the terminal obtains the C/I ratio from the pilot signals contained in the received packets, searches the table 60 with the C/I ratio, and thereby determines the transmission rate to be requested of the base station that transmitted the packets.

FIG. 7 is a flow chart showing the process for obtaining the number of used data slots and the number of idle slots. In radio communication systems like 1×EV-DO, each slot of the traffic data area 1100 stores data that have been encoded by spread code uniquely assigned to each terminal as the key, therefore each terminal can not directly recognize the data as it is. Further, since the assignment of slots to the terminals is determined by the base station according to algorithm considering the transmission rates requested by the terminals, each terminal can not immediately judge to which terminal each slot has been addressed (or whether or not each slot is an idle slot addressed to no terminal). Thus, in order to acquire data addressed to itself, each terminal successively despreads the data stored in each slot using the spread code key assigned to itself by the base station, judges whether or not the despread data has autocorrelation, and extracts data exclusively from slots having the autocorrelation. Therefore, the following process of FIG. 7 becomes necessary for judging whether each slot is an idle slot or not and count the numbers of used data slots and idle slots in a prescribed time period.

First, the terminal initializes various data in order to count the number of idle slots (step 902). In the step 902 shown in FIG. 7, the symbol "s" denotes a counter value indicating the number of counted slots, "p" denotes a counter value indicating the number of idle slots included in the counted slots, "M" denotes the upper limit of the spread code key (63 in 1×EV-DO) which also means the upper limit of the key employed for the despreading of each slot, and "S" denotes the total number of slots included in a prescribed time period. The length of the prescribed time period can arbitrarily be set and varied.

After the initialization of various data, a number "n" designating a key to be used for the despreading is first set to the lower limit of the spread code key (set to 5 in 1×EV-DO) (step 903). When the number s of counted slots does not exceed the total number S of slots included in the prescribed time period (YES in step 904) and the spread code key n does not exceed the upper limit M (YES in step 905), the signal processing unit 120 despreads a slot of the traffic data area 1100 using the spread code key n as the key (step 906).

If the data obtained by the despreading has autocorrelation (YES in step 907), it means that the slot stores data addressed to a terminal to which the spread code key n has been assigned. In this case, the signal processing unit 120 judges that the slot is not an idle slot, increments the counter value s indicating the number of counted slots (step 910), and then repeats the process for the next slot. On the other hand, if the despread data does not have autocorrelation (NO in step 907), the signal processing unit 120 increments the number n to designate the next spread code key (step 908) and executes the process from the step 905 using the next spread code key.

If the spread code key n has become the upper limit M or more (NO in the step 905), that is, if no autocorrelation has been found in spite of the despreading of the slot by use of all the spread code keys, it means that the slot has been addressed to no user (no terminal). In this case, the signal processing unit 120 increments both the counter value p (indicating the number of idle slots) and the counter value s (indicating the number of counted slots) (step 909). By repeating the above process for all the slots in the prescribed time period, the number of idle slots can be obtained.

By the above process, the number s of counted slots, the number p of idle slots, and the number s-p of used data slots (data slots storing data addressed to terminals) are obtained (step 911).

FIG. 8 is a schematic diagram showing a mathematical formula for obtaining the expected throughput. The formula is based on the following concept.

First of all, the expected throughput 601 is dependent not only on the transmission rate 600 that the terminal requested of the base station but also on the number of slots assigned to the terminal by the base station, since the base station is allowed in 1×EV-DO to pack data in each slot changing the modulating method (causing a change in the data transmission rate). Thereby the base station transmits data necessarily at the transmission rate requested by the terminal. Thus, the size of date received by the terminal is obtained as the product of the requested transmission rate and the number of assigned slots (slots assigned to the terminal). For example, when the number of slots assigned to the terminal for a certain time period is small, the amount of data received by the terminal in the time period becomes small and the throughput at the terminal becomes low. On the other hand, the throughput at the terminal becomes high when a large number of slots are assigned to the terminal for a certain time period. Incidentally, the maximum value of the throughput is equal to the transmission rate that the terminal requested of the base station.

However, the terminal can not exactly grasp the number of slots assigned to itself by the base station because the base station changes the slot assignment to each user (each terminal) depending on the number of communicating terminals, data traffic, radio wave conditions at each terminal, etc.

Therefore, the number of slots assigned by the base station to the terminal is estimated as below based on the numbers of used data slots and idle slots obtained by the process of FIG. 7. First, it is assumed that the base station assigns all the idle slots 603 to the terminal under consideration. Meanwhile, an average number 607 of slots assigned by the base station to the terminal is obtained as the number 604 of used data slots divided by the number 606 of terminals, in which the number 606 of terminals is obtained by adding 1 (the terminal itself) to the number 605 of communicating terminals (communicating users) obtained by the step 704 of FIG. 5. The number 608 of slots assigned to the terminal is assumed to be the sum of the number 603 of idle slots and the average number 607 of slots assigned by the base station to the terminal.

Therefore, the expected throughput of data transmitted from the base station to the terminal can be estimated by multiplying the requested transmission rate 602 (obtained in FIG. 6) by a ratio 610 that is obtained by dividing the number 608 of slots assigned to the terminal by the total number 609 of slots (the number of used data slots and the number of idle slots added together).

The present invention is characterized by the method for obtaining the expected throughput, based not only on the transmission rate that the terminal requested of the base station but also on the number of communicating (connected) terminals and the expected number of slots assigned to the terminal.

Figure 9:
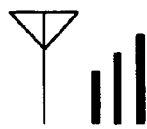
FIG. 9 is a schematic diagram showing an example of display on a display unit of a conventional radio communication terminal.

FIG. 9 is a schematic diagram showing an example of display on a display unit of a conventional radio communication terminal, in which electric field intensity (power) of a radio wave received from the base station (showing voice quality) is digitally indicated by the number of bars beside the antenna icon.

Figure 10:
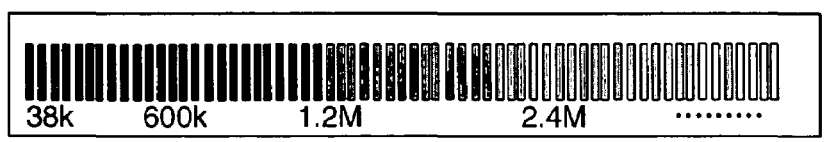
FIG. 10 is a schematic diagram showing an example of display of the expected throughput on a display unit of the terminal of the present invention.
Figure 11:
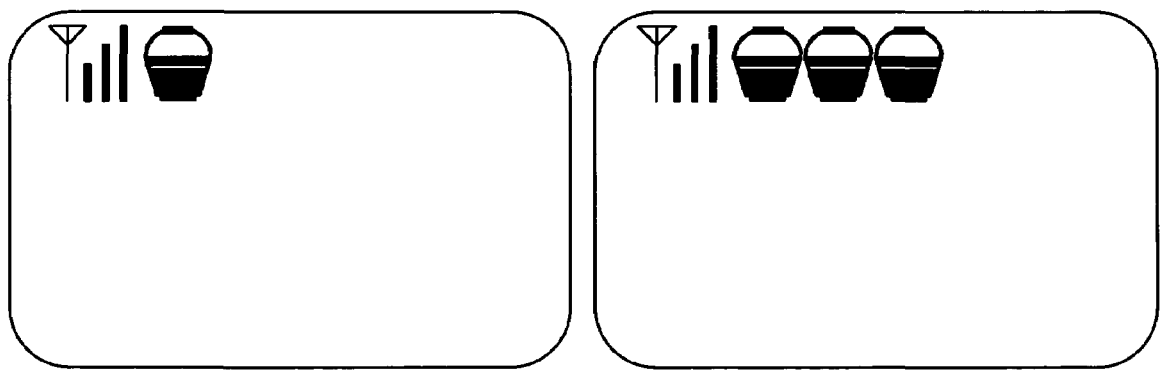
FIG. 11 is a schematic diagram showing another example of display of the expected throughput on a display unit of the terminal of the present invention.

However, high reception power and C/I ratio do not guarantee high throughput in the best effort radio communication system as mentioned above. FIGS. 10 and 11 show examples of display on the display unit 140-2 of the terminal in accordance with the present invention, indicating the expected throughput.

In the example of FIG. 10, the expected throughput obtained by the formula of FIG. 8 is displayed in the form of a peak level meter for easy reading by the user. By displaying the peak level (momentary maximum throughput) for a certain time period, the user can recognize whether the expected throughput is on the increase or decrease at a glance.

In the example of FIG. 11, the peak level meter of FIG. 10 is replaced with bucket symbols. The number of buckets is increased or decreased according to the increase/decrease of the expected throughput.

Incidentally, while FIGS. 10 and 11 have been shown as typical examples of symbols for indicating the expected throughput, other symbols are of course possible as long as the expected throughput is recognizable.

When the terminal is in the active state and during data communication, actual throughput (size of transferred data measured in certain unit time), the number 605 of terminals communicating in the selected sector, etc. may also be displayed on the display unit 140-2.

Further, since the above function in accordance with the present invention increases power consumption of the terminal and decreases maximum duration of data communication, the peripheral unit 140 is provided with an interface (switch, key, etc.) for letting the user turn the function ON and OFF. When the function of the present invention is OFF, the terminal may select a sector that gives the highest radio field intensity of the pilot signal. By the ON/OFF function, power consumption can be reduced when the user does not need the display of the expected throughput.

In the following, the operation of the terminal will be explained in detail using concrete parameters. As shown in FIG. 14, thirty terminals are executing data communication in a sector 200-1 (sector #1), in which a base station 300-1 is communicating with the thirty terminals assigning them 800 slots when the number of slots transmitted in a prescribed time period is 1000 (S=1000 in FIG. 7). Meanwhile, three terminals are executing data communication in a sector 200-2, in which a base station 300-2 is communicating with the three terminals assigning them 400 slots when the number of slots transmitted in a prescribed time period is 1000.

Figure 12:
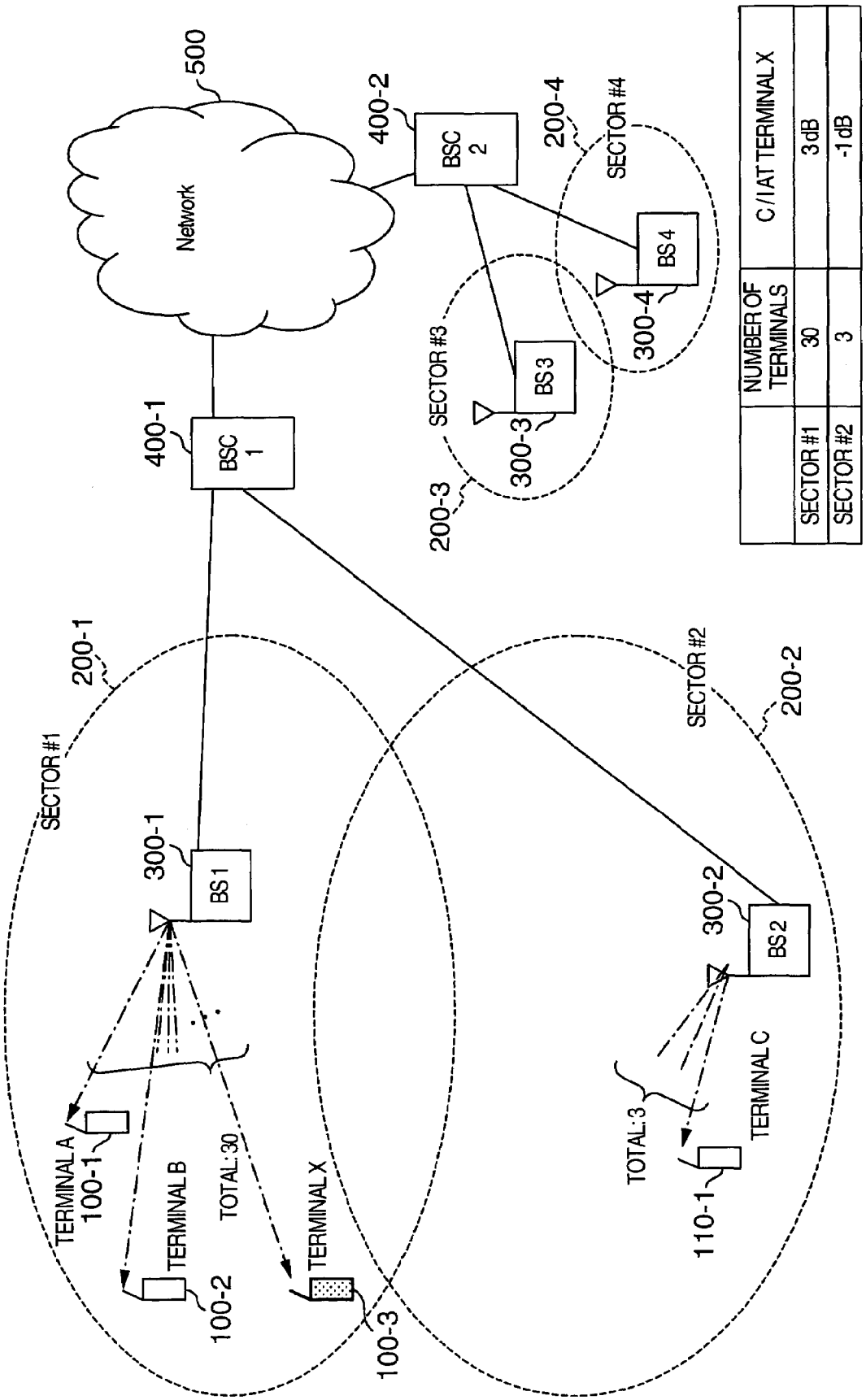
FIGS. 12 and 13 are schematic block diagrams showing the overall composition of the radio communication system for explaining the operation of the radio communication terminal using concrete parameters.

First, the estimation of the throughput when a terminal 100-3 is in the sector 200-1 will be explained referring to FIG. 12. Since the C/I ratio obtained from the pilot signal 1200 is 3 dB, the terminal 100-3 estimates the requested transmission rate as 1228.8 kbit/s by referring to the table 60 of FIG. 6. Subsequently, the terminal 100-3 acquires the number of communicating terminals (connected terminals) from the broadcast message data 1060 and counts the number 603 of idle slots and the number 604 of used data slots according to the flow chart of FIG. 7, by which the terminal 100-3 finds out that the number 603 of idle slots is 200 out of 1000 slots (in the case where the total number S of slots included in the prescribed time period is 1000), the number 604 of used data slots is 800, and the number of terminals communicating in the sector is 30. By substituting the values into the formula of FIG. 8, the expected throughput in the sector #1 (sector 200-1) is obtained as 277.5 kbit/s. In this case, the throughput is displayed on the display unit 140-2 since the packets 1000 are all received from the base station 300-1 only. The user of the terminal 100-3 learns the expected throughput (throughput that is expected to be attained in actual communication) by seeing the display. When a call is originated, the terminal 100-3 sends a connection request to the base station 300-1.

Figure 13:
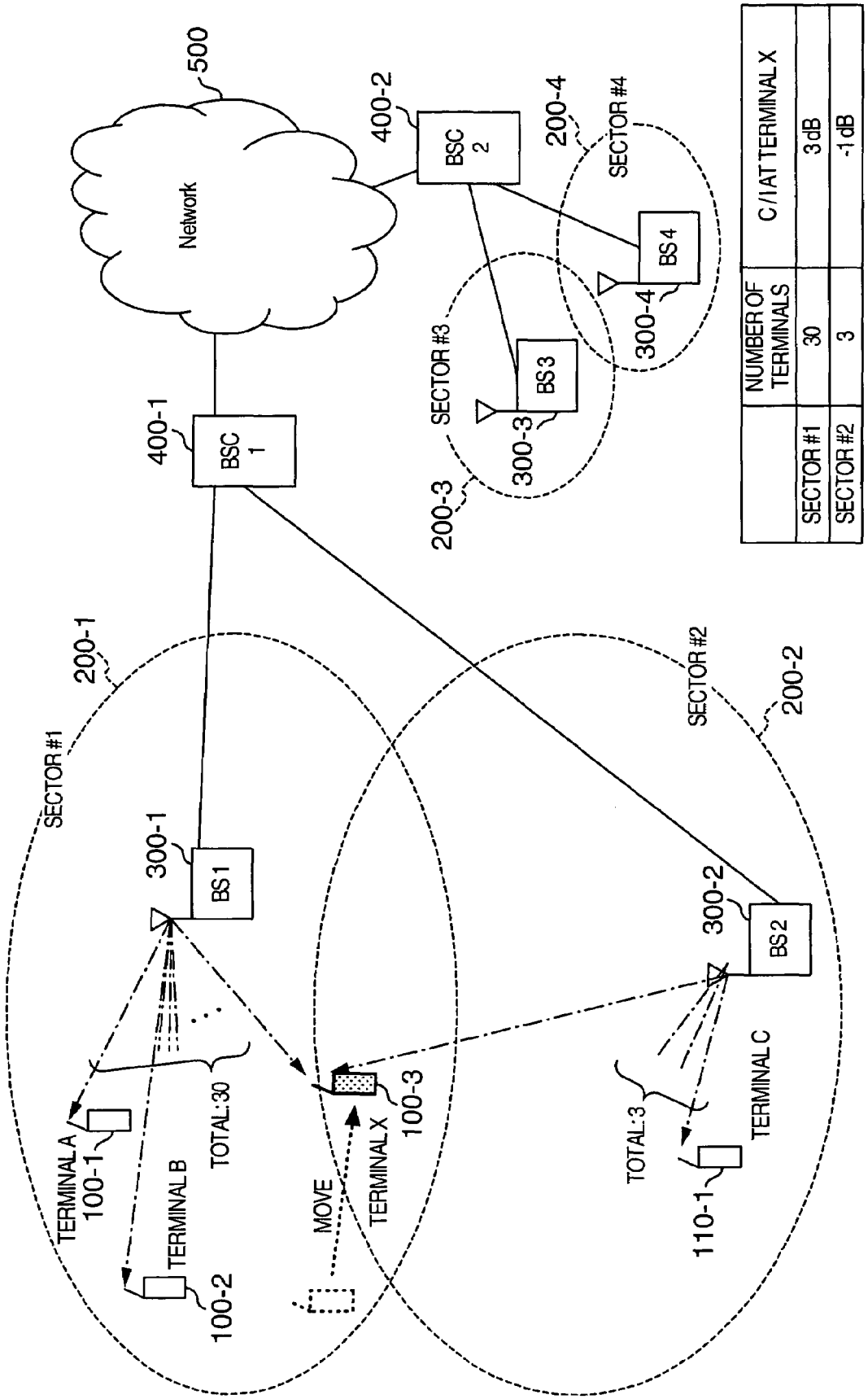

However, if the terminal 100-3 moves into the position shown in FIG. 13 (in the overlapping area of the sectors 200-1 and 200-2) before starting communication, the terminal 100-3 receives packets 1000 from both the base stations 300-1 and 300-2. In this case, the terminal 100-3 calculates expected throughputs for two cases: communication with the base station 300-1 and communication with the base station 300-2, and displays the highest one of the expected throughputs on the display unit 140-2.

For the sector 200-1, the terminal 100-3 obtains the expected throughput as 277.5 kbit/s in the same way as the above explanation. For the sector 200-2, since the C/I ratio obtained from the pilot signal 1200 is −1 dB, the terminal 100-3 first estimates the requested transmission rate as 614.4 kbit/s by referring to the table 60 of FIG. 6. Subsequently, the terminal 100-3 acquires the number of communicating terminals from the broadcast message data 1060 and counts the number 603 of idle slots and the number 604 of used data slots according to the flow chart of FIG. 7, by which the terminal 100-3 finds out that the number 603 of idle slots is 600 out of 1000 slots (in the case where S=1000), the number 604 of used data slots is 400, and the number of terminals communicating in the sector 200-2 is 3. By substituting the values into the formula of FIG. 8, the expected throughput in the sector #2 (sector 200-2) is obtained as 430.1 kbit/s.

Results of the above process for obtaining the expected throughput are shown in FIG. 15, in which the expected throughput in the sector #2 is higher. In this case, the expected throughput of the sector 200-2 is displayed on the display unit 140-2 of the terminal 100-3, by which the user learns the expected throughput (throughput that is expected to be attained in actual communication). When a call is originated, the terminal 100-3 executes a process for establishing connection with the base station 300-2. It is also possible to display both the throughput in the sector 200-1 and the throughput in the sector 200-2 and carry out communication by selecting a base station in a sector selected.

As described above, by the radio communication terminal and the communication method in accordance with the embodiment of the present invention, the expected throughput can be estimated by each terminal. Thus, in cases where high-throughput data communication is necessary, the expected throughput can be used as major information for judging whether the data communication should be started or not, by which the terminal's degree of freedom in data communication is enhanced and service quality can be improved.

By the employment of the interface (switch, key, etc.) for letting the user turn the above functions ON and OFF, the flexibility of sector selection is increased and thereby further improvement of service quality can be expected.

From the viewpoint of infrastructure, the estimation of expected throughput and the selection of sector in accordance with the present invention can be realized only by adding the above functions to terminals with relatively low remodeling costs. The present invention provides an economical approach involving almost no alteration of the operation of network devices (base stations, etc. requiring high remodeling costs).

Further, the selection of base station and the establishment of communication channel are carried out on the initiative of the terminals, which contributes to load balancing for the network devices such as base stations.

Incidentally, while the estimation of the expected throughput and the determination of the selected sector were carried out by the signal processing unit 120 shown in FIG. 2, the processes may also be conducted by the processor 150.

While the above explanation has been given assuming the terminal is in the idle state, the present invention is applicable regardless of whether the terminal is in the idle state or in the active state (call connected state). For example, assuming that the terminal 100-3 has been call connected with the base station 300-1 in the sector 200-1, the terminal 100-3 is connected to the base station 300-2 in the sector 200-2 if the sector 200-2 gives a higher expected throughput. The terminal 100-3 sends a connection request to the base station 300-2, and in response to an output of the base station 300-2 receiving the connection request, the connection is switched to the base station 300-2. By this embodiment, the terminal continues selecting a more suitable sector capable of delivering a higher transmission rate at the current position, by which erroneous continuation of low speed data communication with the presence of a more suitable sector can be avoided and thereby highly efficient data communication can be realized.

The embodiments explained above is applicable to radio communication systems (1×EV-DO, etc.) in which the transmission rate changes depending on radio wave conditions and communication statuses of other users.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A radio communication terminal which communicates packets with a base station, comprising:
   a reception means which receives the packets transmitted by the base station in an idle state of the radio communication terminal;
   a signal processing means which calculates an estimated transmission rate available after a communication path is established, based on information included in the packets received by the reception means; and
   a display means which displays information indicating the estimated transmission rate calculated by the signal processing means;
   wherein:
   each packet includes a broadcast message area and a communication information area, and
   each of the areas is composed of a plurality of slots as units of time division;
   wherein:
   each slot of the broadcast message area and the communication information area contains a pilot signal, and
   information indicating the number of radio communication terminals connected with the base station is stored in a slot of the broadcast message area;
   wherein the signal processing means includes:
   a determination means which obtains a parameter regarding signal quality from the pilot signal and determines a transmission rate to be requested of the base station based on the parameter;
   an acquisition means which acquires the number of radio communication terminals connected with the base station from the information indicating the number of radio communication terminals; and
   a measuring means which measures the number of used slots and the number of idle slots by referring to the communication information, wherein:
   the transmission rate available in communication is estimated from the requested transmission rate, the number of radio communication terminals, the number of used slots and the number of idle slots.

2. The radio communication terminal according to claim 1, wherein the parameter regarding signal quality is a C/I ratio.

3. The radio communication terminal according to claim 1, wherein the transmission rate available in communication is obtained by the following formula:

$$\text{REQUESTED TRANSMISSION RATE} \times \left\{ \frac{\text{NUMBER OF IDLE SLOTS} + \left( \frac{\text{NUMBER OF USED DATA SLOTS}}{(\text{NUMBER OF CONNECTED TERMINALS}+1)} \right)}{\text{NUMBER OF USED DATA SLOTS} + \text{NUMBER OF IDLE SLOTS}} \right\}.$$

4. A radio communication terminal which communicates packets with a plurality of base stations, comprising:
   a reception means which receives the packets transmitted by each of the base stations in an idle state of the radio communication terminal;
   a signal processing means which calculates an estimated transmission rate available after a communication path is established with each of the base stations based on information included in the packets received by the reception means and selects the highest one of the estimated transmission rates; and
   a display means which displays information indicating the estimated transmission rate selected by the signal processing means;
   wherein:
   each of the packets includes a broadcast message area and a communication information area,
   each of the areas is composed of a plurality of slots as units of time division;
   each slot of the broadcast message area and the communication information area contains a pilot signal, and information indicating the number of radio communication terminals connected with the base station is stored in a slot of the broadcast message area; and
   wherein the signal processing means includes:
   a determination means which obtains a parameter regarding signal quality from the pilot signal and determines a transmission rate to be requested of each of the base stations that transmitted the packets based on the parameter;
   an acquisition means which acquires the number of radio communication terminals connected with each of the base stations that transmitted the packets based on the information indicating the number of radio communication terminals; and
   a measuring means which measures the number of used slots and the number of idle slots by referring to the communication information of each packet, wherein:
   the transmission rate available in communication is estimated from the requested transmission rate, the number of radio communication terminals, the number of used slots and the number of idle slots obtained from each packet, and the highest transmission rate is selected from the estimated transmission rates.

5. The radio communication terminal according to claim 4, wherein the parameter regarding signal quality is a C/I ratio.

6. The radio communication terminal according to claim 4, wherein the transmission rate available in communication is obtained by the following formula:

$$\text{REQUESTED TRANSMISSION RATE} \times \left\{ \frac{\text{NUMBER OF IDLE SLOTS} + \left( \frac{\text{NUMBER OF USED DATA SLOTS}}{(\text{NUMBER OF CONNECTED TERMINALS}+1)} \right)}{\text{NUMBER OF USED DATA SLOTS} + \text{NUMBER OF IDLE SLOTS}} \right\}.$$

7. A communication method for a radio communication terminal having a signal processing means which processes signals received from a plurality of base stations and a display means which displays results of the processing, comprising the steps of:
   receiving a signal from each of the base stations that is in an idle state of the radio communication terminal;
   obtaining a parameter regarding signal quality from each of the received signals;
   determining a transmission rate to be requested of each of the base stations that transmitted the signal based on the parameter;
   acquiring the number of base stations connected with each of the base stations that transmitted the signal based on first information contained in each received signal;
   counting the number of used slots and the number of idle slots based on second information contained in each received signal;
   calculating estimated transmission rates available after connection paths are established based at least on the requested transmission rate, the number of terminals, the number of used slots and the number of idle slots obtained from each received signal;
   selecting the highest estimated transmission rate from among the calculated estimated transmission rates;
   displaying information indicating the selected highest estimated transmission rate on the display means; and
   requesting the base stations that are capable of communicating at the selected highest estimated transmission rate to establish a connection in response to a request for call origination.

8. The communication method according to claim 7, wherein the parameter regarding signal quality is a C/I ratio.

9. The communication method according to claim 7, wherein the transmission rate available in communication is obtained by the following formula:

$$\text{REQUESTED TRANSMISSION RATE} \times \left\{ \frac{\text{NUMBER OF IDLE SLOTS} + \left( \frac{\text{NUMBER OF USED DATA SLOTS}}{(\text{NUMBER OF CONNECTED TERMINALS}+1)} \right)}{\text{NUMBER OF USED DATA SLOTS} + \text{NUMBER OF IDLE SLOTS}} \right\}.$$

* * * * *